United States Patent [19]

Rea

[11] Patent Number: 4,526,549

[45] Date of Patent: Jul. 2, 1985

[54] CELESTIAL GLOBE

[76] Inventor: R. Stephen Rea, 11253 Brownell, Plymouth, Mich. 48170

[21] Appl. No.: 652,129

[22] Filed: Sep. 20, 1984

[51] Int. Cl.³ .............................................. G09B 27/06
[52] U.S. Cl. .................................................... 434/288
[58] Field of Search ................................ 434/287, 288

[56] References Cited

U.S. PATENT DOCUMENTS

| 336,280 | 2/1886 | Bailey | 434/288 |
| 2,399,365 | 4/1946 | Link | 434/288 |
| 2,515,401 | 7/1950 | Dupler | 434/288 |

FOREIGN PATENT DOCUMENTS

| 15499 | 10/1881 | Fed. Rep. of Germany | 434/288 |
| 366193 | 1/1923 | Fed. Rep. of Germany | 434/288 |
| 284708 | 4/1931 | Italy | 434/287 |

Primary Examiner—William H. Grieb
Attorney, Agent, or Firm—Charles W. Chandler

[57] ABSTRACT

A transparent globe marked with various celestial objects is partially filled with water. A disk floats on the water to provide a reference position with respect to the celestial objects. The relationship between the reference position and the celestial objects can be studied by rotating the globe about its axis.

5 Claims, 3 Drawing Figures

CELESTIAL GLOBE

BACKGROUND OF THE INVENTION

This invention is related to transparent celestial globes, and more particularly to such a globe in which the earth is represented by a member that floats on liquid disposed in the globe so that the user can change the reference point from which the celestial objects are being studied by moving the globe about its axis.

Conventional celestial globes are used as a teaching aid to provide students with an idea of the relationship between the earth and various celestial bodies at different times of the day and night.

Most commercially available celestial globes employ a body representing the earth and mounted within the globe. Usually the earth is mounted on a rod which forms an axis passing through the north and south poles. One side of the rod extends beyond the globe so that the user can rotate the earth with respect to the globe to change the relationship between the celestial bodies and different locations on the earth.

SUMMARY OF THE INVENTION

The broad purpose of the present invention is to provide a transparent globe containing a quantity of water on which a disk-shaped member floats to form a reference point for studying its relationship with a celestial body marked on the surface of the globe.

The preferred embodiment of the invention comprises a transparent globe mounted on a ring by a pair of pivots aligned with an axis that passes through the North and South Poles of the globe. The ring can be slid in a curved seat in a base so that the globe is movable about two mutually perpendicular axes. The globe is half filled with water and a house representing the user's point of reference floats on the water. The reference point can be located according to any desired latitude with respect to the globe. The model provides a valuable tool for teaching students to locate and identify the stars and constellations. The small house located in the landscape representing the users location in the model, can be set for a particular day of the year and time of night. The constellations on the globe which appear directly over the observer's house will be the same ones he see in the real sky. All the other constallations will likewise be in their correct reference position in terms of altitude and direction. Further, to help the user to understand the constellations and their daily motions, the globe can be rotated until a chosen star or constellation appears above the horizon. When the student checks the time represented by the globe, he can predict the actual time that the object rises in the real sky.

By rotating the globe about its axis, the daily motion of the sky can be simply demonstrated. The paths of the stars, moon and planets as well as the sun can be clearly seen as they move across the sky by using appropriate cut-outs for the moon and the sun. The rising and setting points along the horizon and the altitude at mid-day can be simply observed and measured. These motions can then be compared to the same motions as seen at different latitudes on earth by rotating the metal ring that supports the globe. The motions of the heavens can be observed from the poles where all the stars are circumpolar, to the earth's equator, showing the sun to rise perpendicular to the horizon and then to pass high over the observer's head.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts through the several views, and in which.

DESCRIPTION OF THE PREFERRED EMBODIMENT

Figure 1:
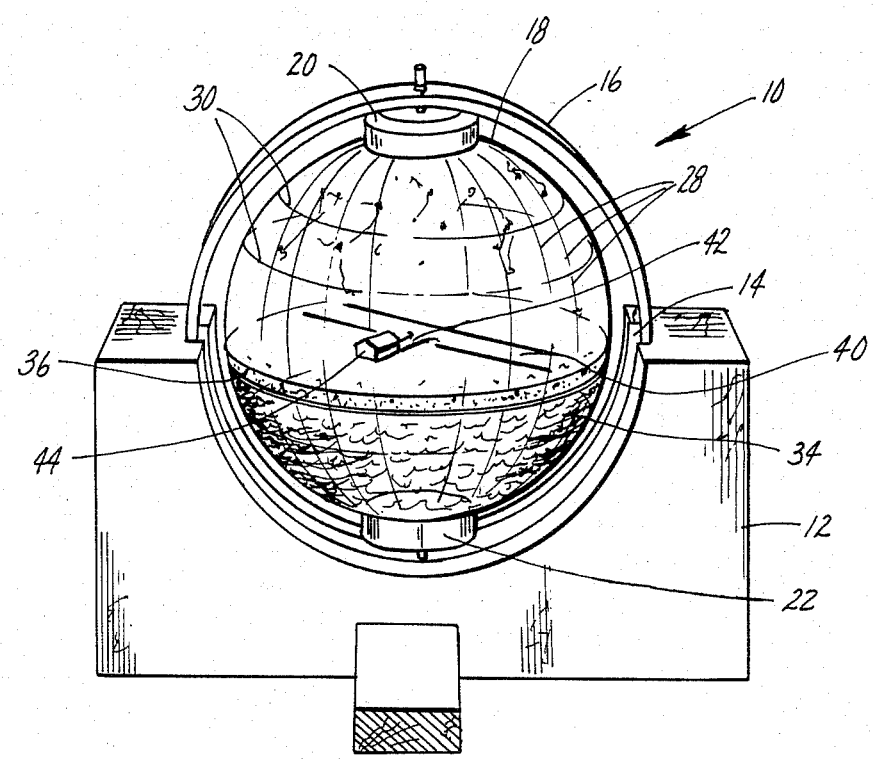
FIG. 1 is a perspective view of a celestial globe illustrating the preferred embodiment of the invention.

Referring to the drawing, FIG. 1 illustrates a celestial transparent globe 10 which includes base 12. Base 12 has a semicircular groove 14. Ring 16, having a diameter slightly smaller than the diameter of groove 14, is slideably mounted within the groove.

A transparent hollow sphere 18 is mounted in the ring. A pair of pivot means 20 and 22 mounted upon opposite sides of the sphere support it within the ring such that the sphere can be rotated about an axis 24 which passes through what represents the North and South Poles.

When the ring is slideably rotated in groove 14 the sphere moves with the ring. The ring can also be rotated about a horizontal axis 26 which passes through the center of the ring and is perpendicular to axis 24. Preferrably the sphere has lines of right ascension 28 and lines of declination 30 marked on it in the conventional manner. A plurality of celestial bodies 32 are also mounted on the surface of the sphere to represent celestial systems such as the Big Dipper and the like.

The sphere is water tight and is about half filled with a liquid, 34 such as water. The liquid may be dyed to present a contrasting color. A floating disk 36 is disposed in the sphere to float on the liquid. The disk always remains in a horizontal position on the surface of the water regardless of the position of the sphere with respect to the base. For illustrative purposes, the top surface of the disk has a pattern representing a road 40 intersecting with a driveway 42, and a house 44 to provide a reference position with respect to the celestial arrangement. The periphery of the disk represents the horizon.

Figure 2:
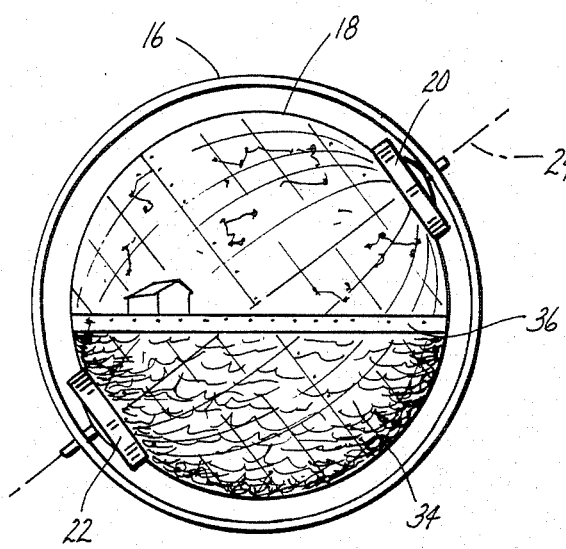
FIG. 2 is a view illustrating the globe tilted about its horizontal axis.
Figure 3:
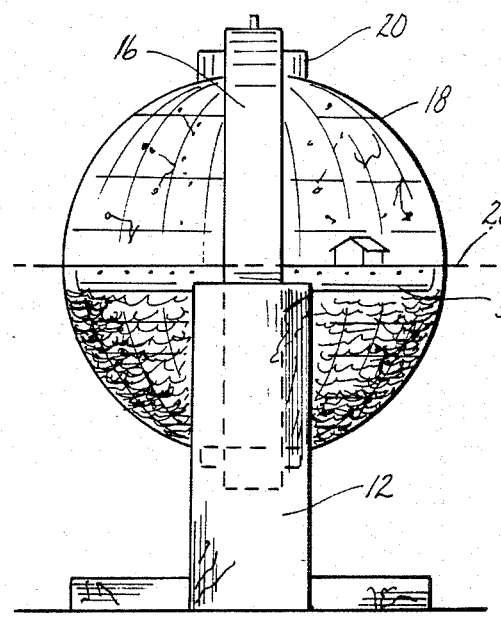
FIG. 3 is a view as seen from the left side of FIG. 1.

The user can change the latitude of the reference position by sliding the ring and sphere downwardly toward a position illustrated in FIG. 2 or still further toward an upside down position in which the reference position is exposed to constellations below the equator. The user can also rotate the sphere about its axis to accommodate either the particular time of day or his position on the earth to study the relationship of the stars with respect to the reference position.

Although the relative positions of the constellations remains constant, the position of the sun and the moon with respect to the stars continually changes. Cut-outs, not shown, can be adhesively attached to the sphere to represent the sun and the moon and then relocated on the sphere as needed.

Having described my invention, I claim:

1. A celestial globe for demonstrating the relationship between the earth and celestial bodies comprising:
   a base;
   a hollow sphere having an interior viewable from a position exterior of the sphere;
   means representing celestial objects mounted on the sphere;
   support means mounted on the base and supporting the sphere such that it is movable about two mutually perpendicular axes with respect to the base;
   liquid means disposed in the sphere and partially filling same; and
   means floating on the liquid means to form a reference point with respect to the celestial objects portrayed on the sphere.

2. A celestial globe as defined in claim 1, including means forming lines of right ascension and lines of declination marked on the sphere with reference to said mutually perpendicular axes.

3. A celestial globe as defined in claim 1, in which the sphere comprises a hollow member formed of a transparent material.

4. A celestial globe as defined in claim 1, in which the support means include a ring, means supporting the sphere in the ring such that they are movable together as the ring is moved with respect to the base, and means in the base forming a curved seat for the ring for slideable rotational motion about the center of the ring.

5. A celestial globe as defined in claim 1, in which the liquid comprises water.

* * * * *